United States Patent
Bedingfield, Sr.

(10) Patent No.: US 7,609,820 B2
(45) Date of Patent: Oct. 27, 2009

(54) IDENTIFICATION AND MANAGEMENT OF AUTOMATICALLY-GENERATED VOICEMAIL NOTIFICATIONS OF VOICEMAIL AND ELECTRONIC MAIL RECEIPT

(75) Inventor: James Carlton Bedingfield, Sr., Lilburn, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 962 days.

(21) Appl. No.: 10/706,361

(22) Filed: Nov. 12, 2003

(65) Prior Publication Data

US 2005/0100143 A1 May 12, 2005

(51) Int. Cl.
*H04M 1/64* (2006.01)
*H04M 11/00* (2006.01)
(52) U.S. Cl. .................................. 379/88.12; 379/88.17
(58) Field of Classification Search ........................ None
See application file for complete search history.

(56) References Cited

U.S. PATENT DOCUMENTS

| | | | |
|---|---|---|---|
| 5,163,130 A | 11/1992 | Hullot | |
| 5,475,738 A * | 12/1995 | Penzias | 379/88.14 |
| 5,479,411 A | 12/1995 | Klein | |
| 5,862,325 A | 1/1999 | Reed | |
| 5,944,786 A * | 8/1999 | Quinn | 709/206 |
| 5,995,597 A | 11/1999 | Woltz | |
| 6,035,273 A | 3/2000 | Spies | |
| 6,052,442 A | 4/2000 | Cooper | |
| 6,064,990 A | 5/2000 | Goldsmith | |
| 6,131,121 A | 10/2000 | Mattaway | |
| 6,226,678 B1 | 5/2001 | Mattaway | |
| 6,249,808 B1 | 6/2001 | Seshadri | |
| 6,263,064 B1 | 7/2001 | O'Neal | |
| 6,282,183 B1 | 8/2001 | Harris | |
| 6,335,963 B1 * | 1/2002 | Bosco | 379/88.12 |
| 6,345,288 B1 | 2/2002 | Reed | |
| 6,349,336 B1 | 2/2002 | Sit | |

(Continued)

OTHER PUBLICATIONS

Kirkpatrick; U.S. Appl. No. 09/604,965, filed Jun. 28, 2000.

(Continued)

*Primary Examiner*—Curtis Kuntz
*Assistant Examiner*—Joseph T Phan
(74) *Attorney, Agent, or Firm*—Thomas, Kayden, Horstemeyer & Risley, LLP

(57) ABSTRACT

Methods and systems are provided for utilizing voicemail messages to notify a subscriber of electronic mail receipt. A message notification and consolidation module monitors e-mail received, read, deleted or otherwise disposed of by an e-mail receiver (subscriber). Upon receipt of an e-mail message, the message notification and consolidation module constructs an e-mail notification message for depositing into the subscriber's voicemail system for alerting the subscriber that the subscriber has received an electronic mail message. At the beginning of the notification message, a unique identification tone is provided for identifying and locating the notification message. If the e-mail receiver disposes of a given e-mail message, or if the e-mail receiver receives a subsequent e-mail message, the message notification and consolidation module may use the identification tone to locate a previous notification message deposited in the subscriber's voicemail box to either delete the notification message or to deposit a consolidated notification message containing information regarding multiple e-mail messages received by the subscriber.

15 Claims, 4 Drawing Sheets

U.S. PATENT DOCUMENTS

| | | | |
|---|---|---|---|
| 6,351,523 B1 | 2/2002 | Detlef | |
| 6,400,810 B1 | 6/2002 | Skladman | |
| 6,421,781 B1 | 7/2002 | Fox | |
| 6,453,337 B2 | 9/2002 | Miller | |
| 6,457,045 B1 | 9/2002 | Hanson | |
| 6,463,145 B1 | 10/2002 | O'Neal | |
| 6,507,643 B1 * | 1/2003 | Groner | 379/88.14 |
| 6,560,456 B1 | 5/2003 | Lohtia | |
| 6,633,848 B1 | 10/2003 | Johnson | |
| 6,640,301 B1 | 10/2003 | Ng | |
| 6,647,260 B2 | 11/2003 | Dusse | |
| 6,728,731 B2 | 4/2004 | Sarukkai | |
| 6,732,151 B1 | 5/2004 | Tobias | |
| 6,738,820 B2 | 5/2004 | Hilt | |
| 6,742,127 B2 | 5/2004 | Fox | |
| 6,754,181 B1 | 6/2004 | Elliott | |
| 6,766,299 B1 | 7/2004 | Bellomo | |
| 6,895,558 B1 | 5/2005 | Loveland | |
| 6,965,918 B1 | 11/2005 | Arnold | |
| 6,981,062 B2 | 12/2005 | Suryanarayana | |
| 6,987,840 B1 * | 1/2006 | Bosik et al. | 379/88.17 |
| 7,085,812 B1 | 8/2006 | Sherwood | |
| 7,113,501 B2 | 9/2006 | Garakani | |
| 7,120,671 B2 | 10/2006 | Gusler | |
| 7,136,475 B1 * | 11/2006 | Rogers et al. | 379/213.01 |
| 7,196,807 B2 | 3/2007 | Goldstone | |
| 7,240,095 B1 | 7/2007 | Lewis | |
| 2002/0032741 A1 | 3/2002 | Hilt | |
| 2002/0035607 A1 | 3/2002 | Checkoway | |
| 2002/0061003 A1 | 5/2002 | Sumner | |
| 2002/0064137 A1 | 5/2002 | Garakani | |
| 2002/0155848 A1 | 10/2002 | Suryanarayana | |
| 2003/0055902 A1 | 3/2003 | Amir | |
| 2003/0072451 A1 | 4/2003 | Pimentel | |
| 2003/0142364 A1 | 7/2003 | Goldstone | |
| 2003/0177171 A1 | 9/2003 | Brown | |
| 2004/0068665 A1 | 4/2004 | Fox | |
| 2004/0086094 A1 * | 5/2004 | Bosik et al. | 379/88.12 |
| 2004/0087300 A1 | 5/2004 | Lewis | |
| 2006/0056603 A1 * | 3/2006 | Harrity | 379/88.12 |
| 2008/0205602 A1 | 8/2008 | Bishop | |
| 2008/0205610 A1 | 8/2008 | Bishop | |

OTHER PUBLICATIONS

Lewis; U.S. Appl. No. 10/080,484, filed Feb. 22, 2002.
Bishop; U.S. Appl. No. 11/678,368, filed Feb. 23, 2007.
Bishop; U.S. Appl. No. 11/678,423, filed Feb. 23, 2007.
Kirkpatrick; Advisory Action mailed Feb. 13, 2004 for U.S. Appl. No. 09/604,965, filed Jun. 28, 2000.
Kirkpatrick; Examiner Interview Summary mailed Sep. 27, 2004 for U.S. Appl. No. 09/604,965, filed Jun. 28, 2000.
Kirkpatrick; Examiner Interview Summary Record mailed Jan. 23, 2008 for U.S. Appl. No. 09/604,965, filed Jun. 28, 2000.
Kirkpatrick; Final Rejection mailed Jan. 23, 2007 for U.S. Appl. No. 09/604,965, filed Jun. 28, 2000.
Kirkpatrick; Final Rejection mailed Aug. 4, 2004 for U.S. Appl. No. 09/604,965, filed Jun. 28, 2000.
Kirkpatrick; Final Rejection mailed Nov. 24, 2003 for U.S. Appl. No. 09/604,965, filed Jun. 28, 2000.
Kirkpatrick; Non-Final Rejection mailed Mar. 11, 2004 for U.S. Appl. No. 09/604,965, filed Jun. 28, 2000.
Kirkpatrick; Non-Final Rejection mailed May 30, 2008 for U.S. Appl. No. 09/604,965, filed Jun. 28, 2000.
Kirkpatrick; Non-Final Rejection mailed Jun. 4, 2003 for U.S. Appl. No. 09/604,965, filed Jun. 28, 2000.
Kirkpatrick; Non-Final Rejection mailed Jul. 25, 2006 for U.S. Appl. No. 09/604,965, filed Jun. 28, 2000.
Kirkpatrick; Non-Final Rejection mailed Nov. 27, 2007 for U.S. Appl. No. 09/604,965, filed Jun. 28, 2000.
Kirkpatrick; Non-Final Rejection mailed Dec. 19, 2002 for U.S. Appl. No. 09/604,965, filed Jun. 28, 2000.
Lewis; Final Rejection mailed Sep. 28, 2006 for U.S. Appl. No. 10/080,404, filed Feb. 22, 2002.
Lewis; Final Rejection mailed Oct. 5, 2005 for U.S. Appl. No. 10/080,484, filed Feb. 22, 2002.
Lewis; Non-Final Rejection mailed Apr. 7, 2005 for U.S. Appl. No. 10/080,484, filed Feb. 22, 2002.
Lewis; Non-Final Rejection mailed Apr. 10, 2006 for U.S. Appl. No. 10/080,484, filed Feb. 22, 2002.
Lewis; Notice of Allowance and Fees Due mailed Mar. 6, 2007 for U.S. Appl. No. 10/080,484, filed Feb. 22, 2002.

* cited by examiner

US 7,609,820 B2

IDENTIFICATION AND MANAGEMENT OF AUTOMATICALLY-GENERATED VOICEMAIL NOTIFICATIONS OF VOICEMAIL AND ELECTRONIC MAIL RECEIPT

FIELD OF INVENTION

The present invention relates to voicemail notifications of voicemail and electronic mail receipt and disposition. More particularly, the present invention relates to identification and management of automatically-generated voicemail notifications of voicemail and electronic mail receipt and disposition.

BACKGROUND OF INVENTION

Voicemail systems provide a very convenient means for receiving information. Typically a voicemail message is recorded by a telephone caller when a receiving telephone called party does not answer or is otherwise engaged. Electronic mail systems likewise provide a very convenient means for sending and receiving a variety of information. Indeed, electronic mail systems have revolutionized the flow of communications and data between interested parties. Electronic mail may be used for simple electronic conversations between two persons, or electronic mail may be used to transmit legal documents, photographs, music, books and the like from one party to another. Often an electronic mail user is away from his/her electronic mail receiving device such as a computer or personal digital assistant. Or, the user may operate his/her computer or other e-mail receiving device via a dial-up connection such that when the user is engaged in a telephone call, the user is not able to receive electronic mail messages.

Accordingly, there is a need for a method and system for utilizing the benefits of a voicemail system for notifying a user of electronic mail messages received by the user so that the user will know to access his/her electronic mail system to review received messages. There is further a need for a method and system for monitoring and managing voicemail notifications of electronic mail receipt. It is with respect to these and other considerations that the present invention has been made.

SUMMARY OF THE INVENTION

Embodiments of the present invention solve the above and other problems by providing methods and systems for utilizing voicemail to notify a subscriber of electronic mail receipt. According to one aspect of the present invention, an electronic mail sender sends electronic mail to an electronic mail receiver (subscriber) through an electronic mail provider. The electronic mail provider receives the electronic mail and places the electronic mail (e-mail) in the subscriber e-mail box. A message notification and consolidation module monitors e-mail received, read, deleted or otherwise disposed of by the e-mail receiver (subscriber).

Upon receipt of the e-mail from the sender, the message notification and consolidation module obtains the subscriber's telephone directory number for accessing the subscribers' telephone voicemail system. The message notification and consolidation module constructs an e-mail notification message for depositing into the subscriber's voicemail system for alerting the subscriber that the subscriber has received an electronic mail message. According to one aspect of the invention, the notification message may be a text-to-speech version of header information from the electronic mail message. According to another aspect of the invention, the notification message may be concatenation of previously recorded voice segments.

At the beginning of the notification message, the message notification and consolidation module inserts a unique identification tone comprised of one or more tones that may be utilized by the message notification and consolidation module for uniquely identifying the notification message constructed for alerting the subscriber of the receipt of the e-mail message. The notification message is transmitted by the message notification and consolidation module via the electronic mail provider through a messaging system directly to the telephone voicemail system of the subscriber. According to one aspect of the invention, at the subscriber's voicemail system, a voicemail receipt indication may be activated without ringing the subscriber's telephone. Upon reviewing the subscriber's voicemail messages, the subscriber is alerted that the subscriber has received an electronic mail message in the subscriber's e-mail box. Accordingly, the subscriber may go online to the subscriber's e-mail system and review the received e-mail message.

The message notification and consolidation module monitors the subscriber's e-mail box for disposition of e-mail messages saved to the subscriber's e-mail box. If the subscriber opens, reads, deletes or otherwise disposes of an e-mail message for which a notification has been sent to the subscriber's voicemail box, the message notification and consolidation module may obtain the subscriber's voicemail box password or other authentication credentials, and the message notification and consolidation module may contact the subscriber's voicemail box and search for the previously deposited notification message based on the unique identification tone placed at the beginning of the notification message by the message notification and consolidation module. Once the message notification and consolidation module finds the appropriate notification message, the message may be deleted from the subscriber's voicemail box. Accordingly, if the subscriber has disposed of a received e-mail message prior to reviewing the voicemail notification, the message notification and consolidation module may delete the voicemail message from the subscriber's voicemail box to prevent confusion of the subscriber.

According to another aspect of the invention, if the subscriber receives a second or subsequent electronic mail message prior to reviewing a voicemail notification associated with a first received electronic mail message, the message notification and consolidation module may access the subscriber's voicemail box and locate a first voicemail notification message associated with the first received e-mail message based on the unique identification tone placed at the beginning voicemail notification message. The voicemail message notification and consolidation module may delete the first voicemail notification message, and the voicemail notification and consolidation module may deposit a new or second voicemail notification message to provide a consolidated notification of the first received e-mail message and the second and/or subsequent e-mail messages received by the subscriber. Accordingly, when the subscriber reviews his/her voicemail messages for the first time, the subscriber will encounter one voicemail notification alerting the subscriber of multiple received e-mail messages.

According to another aspect of the invention, a notification message may be deposited into a called party's voicemail box by calling the called party or by contacting the called party's voicemail box directly. A unique identification tone is inserted at the beginning of the notification message. If it is desired that the deposited notification subsequently should be deleted, replaced or modified, a message notification and consolidation module may contact the called party's voicemail box and search for the previously deposited notification message based on the unique identification tone. Once the notification message is located, it may be deleted, modified, replaced or otherwise disposed of.

These and other features and advantages, which characterize the present invention, will apparent from a reading of the following detailed description and a review of the associated drawings. It is to be understood that both for foregoing general description and the following detailed description are exemplary and explanatory only and are not restrictive of the invention as claimed.

DETAILED DESCRIPTION

As briefly described above, embodiments of the present invention are directed to methods and systems for notifying an electronic mail receiver of received electronic mail through automatically-generated voicemail notifications of electronic mail receipt and disposition. In the following detailed description, references are made to the accompanying drawings that form a part hereof, and in which are shown by way of illustrations, specific embodiments or examples. These embodiments may be combined, other embodiments may be utilized, and structural changes may be made without departing from the spirit or scone of the present invention. The following detailed description is therefore is not to be taken in a limiting sense and the scope of the present invention is defined by the appended claims and their equivalents.

Figure 1:
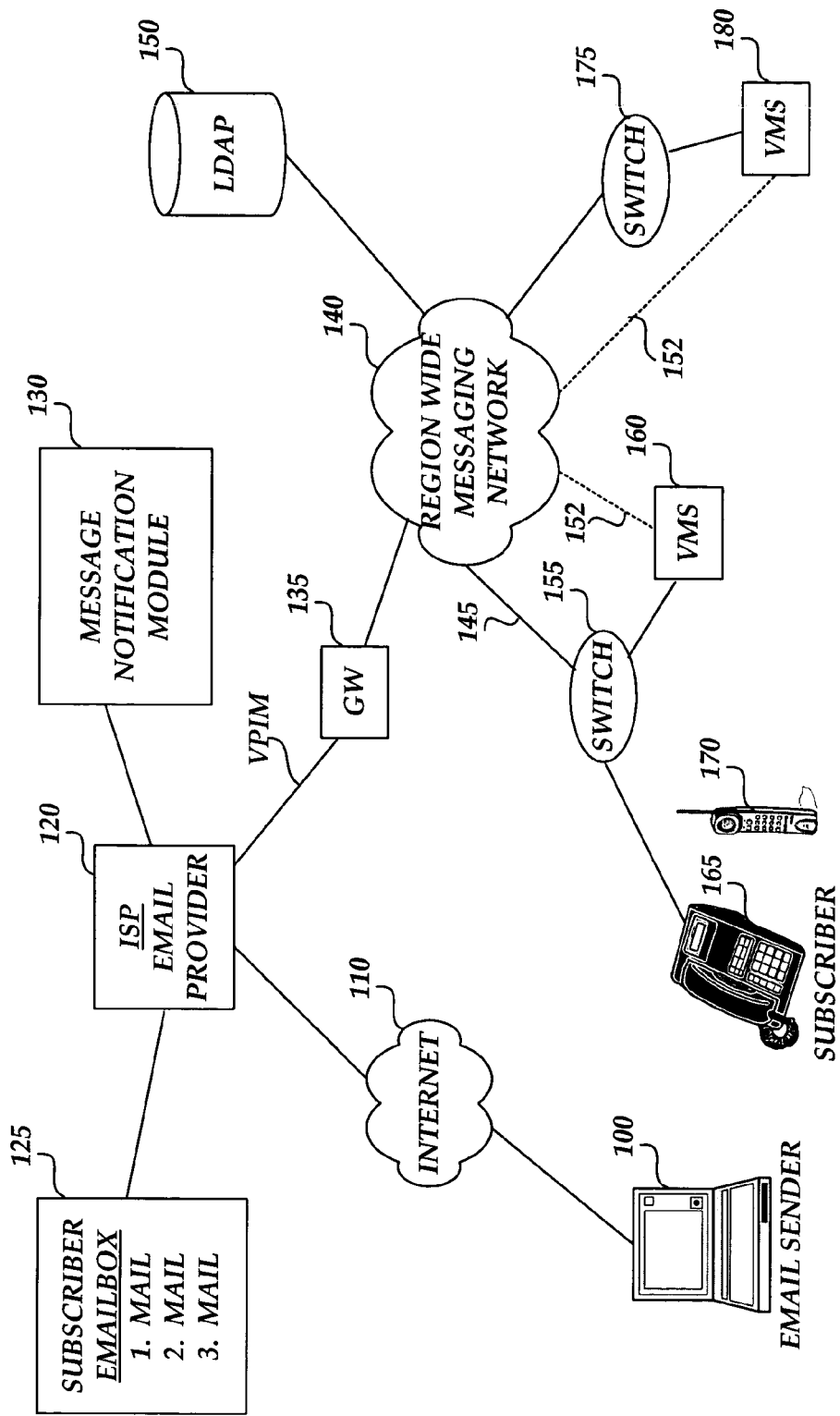
FIG. 1 illustrates an exemplary operating environment for embodiments of the present invention.

FIG. 1 illustrates an exemplary operating environment for embodiments of the present invention. The computer 100 is illustrative of a general-purpose computing system having a processor, memory capacity, and software applications operative to send and receive electronic mail messages through a distributed computing network such as the Internet 110 from an electronic mail sender to an electronic mail receiver. The Internet 110 is illustrative of a collection of distributed and disparate computing systems for communicating across local area and wide area networks.

The Internet services provider/electronic mail provider 120 is illustrative of a services provider for providing individuals or groups of users access to a distributed computing environment such as the Internet 110. According to embodiments of the present invention, the e-mail provider 120 is responsible for receiving, storing and routing electronic mail messages from an electronic mail sender to an electronic mail receiver. As should be understood by those skilled in the art, the electronic mail provider 120 may include a number of general-purpose computing systems, electronic mail servers, memory storage devices, and routing equipment for receiving identifying and storing electronic mail messages from an electronic mail sender to an electronic mail receiver. An exemplary electronic mail provider is bellsouth.net provided by BellSouth Corporation of Atlanta, Ga. As illustrated in FIG. 1, a subscriber e-mail box 125 is illustrative of a memory storage location maintained by the e-mail provider 120 for storing electronic mail directed to a particular electronic mail receiver.

The message notification and consolidation module 130 is a software application program according to embodiments of the present invention having sufficient computer executable instructions which when executed by a computer at the electronic mail provider 120 provides the functionality of embodiments of the present invention described herein. As will be described in detail below, the message notification and consolidation module 130 monitors electronic mail received in a subscriber's e-mail box 125 and constructs, sends and monitors voicemail notifications of electronic mail received by a subscriber (e-mail receiver) at the subscriber's voicemail box through the subscriber's voicemail system 160, described below.

A gateway 135 is provided for providing secure communications between the electronic mail provider 120 and a region wide messaging network 140. The region wide messaging network 140 is a system for transmitting Internet-protocol (IP)-based messages from one voicemail system 160 to a voicemail system 180. As will be described in detail below with reference to FIG. 2, according to embodiments of the present invention a voicemail message may be forwarded from one voicemail user via packetized data transmitted over Internet protocol messaging directly to the voicemail box of a second voicemail user's local voicemail system through the region wide messaging network. Accordingly, a voicemail sender may send a voicemail message directly to the voicemail system of the voicemail receiver where the message is deposited into the voicemail receiver's voicemail box without calling the voicemail receiver at the receiver's telephone.

The region wide messaging system 140 establishes a region wide directory of voicemail subscribers. The directory identifies the voicemail systems servicing individual subscribers. For example as illustrated in FIG. 1, the region wide messaging network 140 directory will show that the voicemail system 160 serves one or more subscribers and the voicemail system 180 serves other subscribers. The lightweight directory access protocol (LDAP) server 150 is illustrative of a database for maintaining voicemail receiver telephone directory numbers and associated voicemail systems, 160, 180 designated for servicing individual or groups of voicemail receivers.

The switches 155, 175 are illustrative of wireline or wireless telecommunications switches for receiving and routing conventional wireline or wireless telecommunications between senders and receivers, as well as packetized data communications between intelligent telecommunications devices such as the voicemail systems 160, 180. Telecommunications from a sending party to a receiving party may be conducted through conventional wireline telecommunications systems or wireless telecommunications systems where wireless telecommunications systems include cellular telecommunications systems, wireless fidelity (WIFI) telecommunications systems, satellite-based wireless telecommunications systems, ultra wideband systems, and the like. Communications between sending and receiving parties according to the present invention may also be conducted via one or more wired data networks such as the Internet 110 accessed via wireline telecommunications networks or via wireless communications networks through wireless access points into a wired data network. The telecommunications devices 165 and 170 are illustrative of wireline/wireless telecommunications devices, including telephones, personal digital assistants, pagers, computers, or any other device capable of sending and receiving telecommunications according to embodiments of the present invention.

The voicemail systems 160, 180 typically include a computer or collection of computers, recording and recording playback devices, and software for recording announcements for incoming calls, for recording and playing back recorded messages, and for receiving incoming calls and for making outgoing calls. The voicemail systems 160, 180 have memory capacity for saving announcements to incoming callers and for saving messages from incoming callers. According to embodiments of the present invention, the voicemail systems 160, 180 may send and receive packetized data over a variety of data transmission protocols such as the Internet protocol directly through the region wide messaging network 140 via data lines 152. As described below with reference to FIG. 2, data communications may be directed from the region wide messaging network 140 directly to one or more voicemail systems 160, 180 to deposit digitized voicemail messages from a voicemail sender to a given voicemail box in voice systems 160, 180. Alternatively, a voicemail sender may deposit voicemail messages into a called party's voicemail box at his/her voicemail system 160, 180 by conventional means such as by calling the called party and depositing a voicemail message if the called party does not answer or by calling the called party's voicemail box directly.

Figure 2:
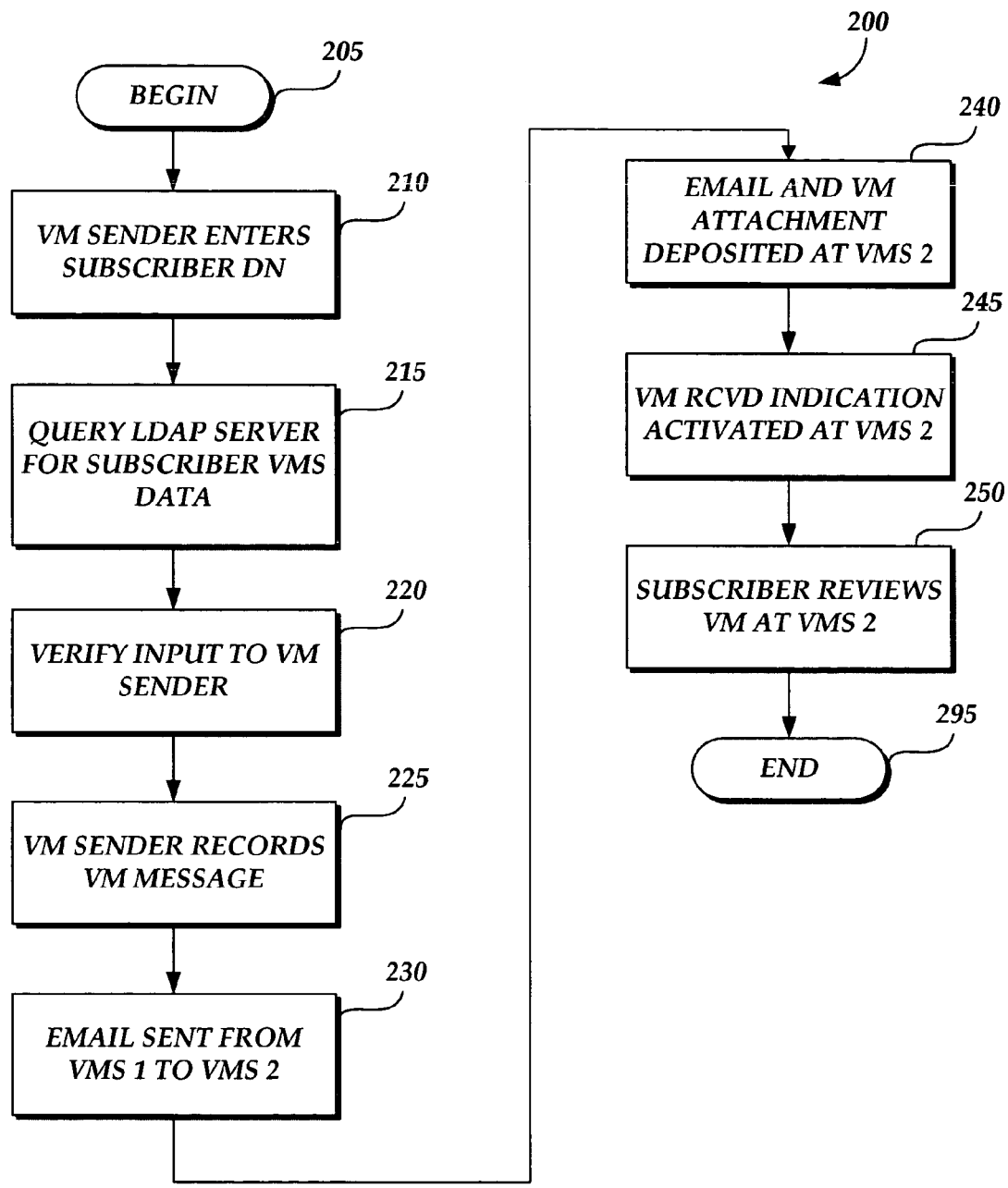
FIG. 2 is a flow diagram illustrating an illustrative routine for sending and receiving voicemail messages directly to and from two or more voicemail systems, via a region wide voicemail messaging system.

As described above with reference to FIG. 1, according to embodiments of the present invention, voicemail messages may be deposited directly to the voicemail box of a voicemail receiver at the receiver's voice system 160, 180 via a region wide messaging network 140. FIG. 2 is a flow diagram illustrating an illustrative routine for sending and receiving voicemail messages directly to and from two or more voicemail systems. According to FIG. 2, the routine 200 begins at start block 205 and proceeds to block 210 where a voicemail sender enters the telephone directory number of a particular subscriber to whom the voicemail sender would like to send a voicemail message directly into the subscriber's voicemail box without calling the subscriber through the subscriber's telephone 160, 170. For example, the voicemail sender may have some interesting information to provide to the voicemail receiver such as an address, a telephone number, a meeting time, an Internet address of interest, and the like.

At block 210, the voicemail sender enters the telephone directory number associated with the voicemail receiver's voicemail box. According to embodiments of the present invention, the voicemail sender may initiate the voicemail communication from the telephone 165, 170, or from a multipurpose computing device such as a computer 100 or personal digital assistant operable for communications with the region wide messaging network 140. That is, a text message may be sent from a computer 100 or personal digital assistant to the voicemail receiver's voicemail box. At block 215, the telephone directory number entered by voicemail sender is transmitted to the region wide messaging network 140 and causes a query to the LDAP server. At the LDAP server, the telephone directory number entered by the voicemail sender is matched against a directory of subscribers to determine the voicemail system designated for servicing the intended recipient of the voicemail message.

At block 220, the region wide messaging network prompts the voicemail sender with information obtained from LDAP server 150 to verify that the telephone directory number entered by the voicemail sender has been correctly matched with the intended recipient. For example, if the voicemail sender enters the telephone directory number of his or her associate, John Smith, the region wide messaging network 140 may prompt the voicemail sender with the name, John Smith, to verify that the intended recipient has been located based on the telephone directory number entered by the voicemail sender.

If the voicemail sender verifies that the information received from region wide messaging network 140 is correct, at block 225, the voicemail sender records the voicemail message he or she would like to send to the voicemail receiver. Alternatively, at block 225, the voicemail sender may enter a voicemail message through a computing device such as the computer 100 or personal digital assistant or other wireless mobile digital device. At block 230, the voicemail message entered by the voicemail sender is deposited with the voicemail sender's voicemail system 160. The voicemail deposited at the sender's voicemail system 160 is converted from analog to digital format, if necessary, and is sent as an electronic message from the voicemail system 160 of the voicemail sender to the voicemail system 180 of the voicemail receiver through the region wide messaging network as a packetized data transmission from the voicemail system 160 to the voicemail system 180 in a similar fashion as a conventional electronic mail message is forwarded from one computing device to a second computing device.

If the original voicemail message is a recorded message, the recorded message may be formatted for electronic transmission in a digital format such as a .WAV file and may be attached to an electronic message for sending to the voicemail receiver at the voicemail system 180. Alternatively, if the voicemail message sent by the voicemail sender is entered as a text message via a computer 100 or personal digital assistant, the text message may be forwarded to the second voicemail system 180, and a text-to-speech synthesizer at the voicemail system 180 may convert the message from the voicemail sender to an audio format for review by the voicemail receiver via the voicemail system 180.

At block 240, the voicemail message from the sender is sent to the voicemail receiver's voicemail box at the voicemail system 180. According to one embodiment, a telephone call and associated ring is not delivered to a telephone of the voicemail receiver. That is, the voicemail message is deposited directly to the receiver's voicemail box. At block 245, a voicemail received indication may be activated at the voicemail receiver's telephone or other voicemail receiving device to indicate to the voicemail receiver that a voicemail message has been deposited in the voicemail receiver's mailbox. The voicemail received indication may be in the form of an illuminated light on the voicemail receiver's telephone, an electronic mail message at the subscriber's computer 100, a distinctive telephone ring or other audio tone, and the like. At block 250, the voicemail receiver accesses his/her voicemail box at the voicemail system 180 and reviews the voicemail message forwarded to the receiver by the voicemail sender. The method ends at block 295.

According to alternate embodiments, voicemail messages may be sent from a voicemail sender to a voicemail receiver's voicemail box without the use of a region wide messaging network 140. The voicemail sender may call the voicemail receiver and if the voicemail receiver does not answer, a voicemail message may be left in the receiver's voicemail box. Alternatively, the voicemail sender may call the voicemail receiver's voicemail box directly by calling the voicemail system 160, 180 that operates the receiver's voicemail box. The sender may then enter an access code or mailbox number to deposit a voicemail message directly into the receiver's voicemail box.

Figure 3:
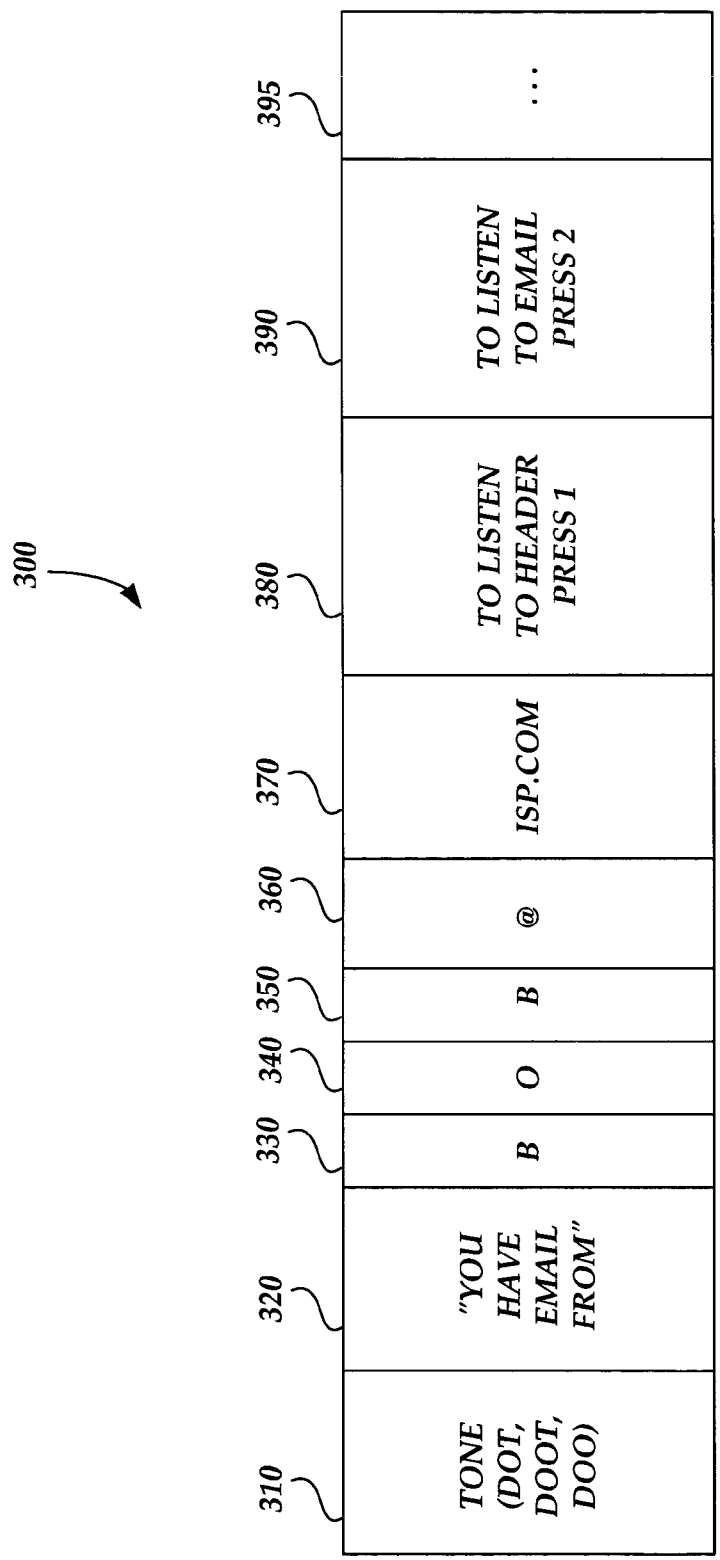
FIG. 3 is a simplified block diagram illustrating a voicemail notification message according to embodiments of the present invention.

According to embodiments of the present invention, a voicemail notification may be deposited directly into the voicemail box of a voicemail receiver, as described above with reference to FIG. 2, in order to notify the voicemail receiver that the voicemail receiver (subscriber) has received electronic mail messages at the receiver's electronic mailbox 125. FIG. 3 is a simplified block diagram illustrating a voicemail notification message according to embodiments of the present invention. The message notification and consolidation module prepares a voicemail message 300 containing information that will allow the voicemail receiver to know what electronic mail messages have been received by the voicemail receiver. The voicemail structure illustrated in FIG. 3 is by way of example only and is not restrictive of the invention as claimed herein.

According to one embodiment, the message notification and consolidation module may convert header information for a given electronic mail message, such as the "from" field, the "subject" field and the "date" field of a given electronic mail message from a text format to a speech format for forwarding to the voicemail system 160 of the voicemail receiver. If desired, a portion or all of the actual body of the electronic mail message may also be converted from text to speech by the message notification and consolidation module so that when the voicemail receiver listens to the notification message deposited at receiver's voicemail system 160, the voicemail receiver may review header information of an associated electronic mail message, or the receiver may even review a portion or all of the actual body of the electronic mail message.

According to another embodiment, the message notification and consolidation module may utilize a library of previously recorded voice components such as "you have e-mail from", "to listen to the header, press 1," and the like. Accordingly, when the message notification and consolidation module 130 prepares a notification message for depositing with the voicemail system of the voicemail receiver, the message notification and consolidation module may concatenate one or more previously recorded voice components to create a voicemail message containing the desired information.

According to embodiments of the present invention, at the beginning of the voicemail message 300 prepared by the message notification and consolidation module a unique identification tone such as the tone 310 is provided. As will be described below with reference to FIG. 4, the identification tone is used by the message notification and consolidation module to locate a given voicemail message deposited in the voicemail receiver's voicemail box. For example, as shown in FIG. 3, a tone of "dot, doot, doo" is entered as a three tone identification for the voicemail message 300. If the message notification and consolidation module subsequently needs to locate the voicemail message 300, the message notification and consolidation module may do so by locating the message having a specified unique identification tone 300 at the beginning of the message 300.

A field 320 of the voicemail message 300 contains a first voice component such as "you have e-mail from". Fields 330, 340, 350 contain concatenated voice components representative of a name associated with the "from" field of an electronic mail message. The fields 360, 370 include additional identifying information for the electronic mail sender's address. Fields 380, 390 include action messages to allow the voicemail receiver to selectively listen to portions of the voicemail message such as to "to listen to the header, press 1." As briefly described above, a portion or all of the body of the electronic mail message may also be included in the field 395. Alternatively, as described above, one continuous text-to-speech formatted message may be prepared by the message notification and consolidation module representing portions of a given electronic mail message.

Figure 4:
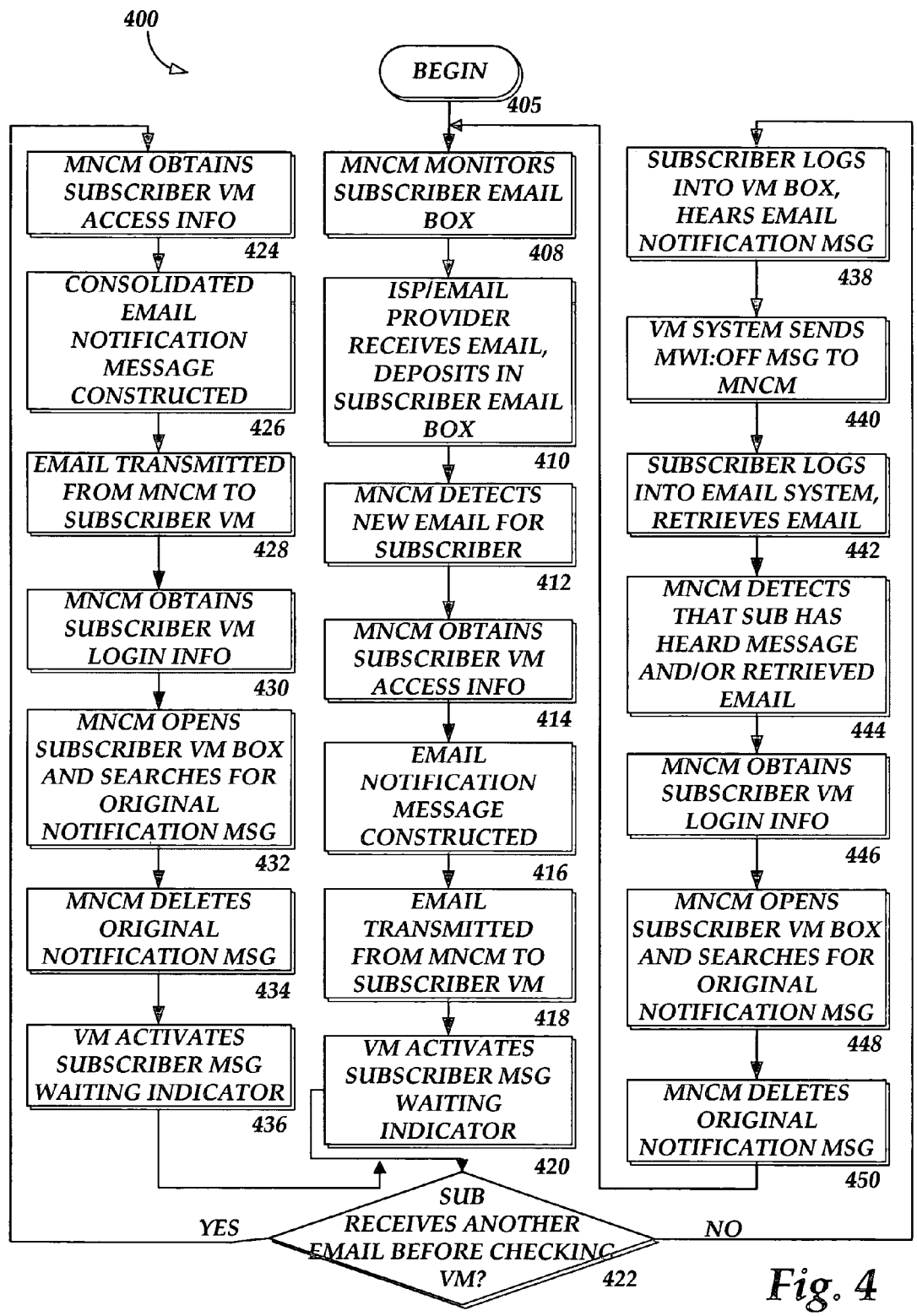
FIG. 4 is a flow diagram showing an illustrative routine for notifying an electronic mail receiver of received electronic mail via voicemail notifications according to embodiments of the present invention.

Having described an exemplary operating environment for the present invention with respect to FIG. 1, and having described a method for transmitting voicemail messages from one voicemail system to another via a region wide messaging network, with respect to FIG. 2, and having described an exemplary voicemail message format with respect to FIG. 3, FIG. 4 is a flow diagram showing an illustrative routine for notifying an electronic mail receiver of received electronic mail via voicemail notifications according to embodiments of the present invention. The method 400 begins at start block 405 and proceeds to block 408 where the message notification and consolidation module (MNCM) begins monitoring the subscriber's email box. At block 410 an electronic mail sender sends an electronic mail message to a subscriber of the message notification and consolidation system of the present invention from the sender's computer 100, illustrated in FIG. 1. At block 410, the Internet services provider/e-mail provider 120 receives the electronic mail message (e-mail message) sent by the e-mail sender via the Internet 110. The e-mail provider 120 deposits the received e-mail message in the subscriber's e-mail box 125 according to well-known electronic mail processing systems and methods.

At block 412, the message notification and consolidation module 130 monitors the subscriber's e-mail box 125 for newly received e-mail messages and for disposition of previously received e-mail messages. At block 414, after detecting a new email to the subscriber, the message notification and consolidation module contacts the region wide messaging network and LDAP server 150 to obtain an electronic messaging address for the subscriber's voicemail box as described above with reference to FIG. 2. When the message notification and consolidation module contacts the LDAP server 150 via the region wide messaging network 140, the region wide messaging network 140 may verify back to the message notification and consolidation module that the information obtained from the LDAP server 150 matches the e-mail receiver/subscriber to whom the message notification and consolidation module wishes to send a notification message.

At block 416, the message notification and consolidation module constructs a voicemail message 300, as described above with reference to FIG. 3. As should be understood by those skilled in the art, the voicemail message may be an electronic messaging attachment attached to a message forwarded by the message notification and consolidation module to the voice email system of the voicemail receiver. For example, the attachment may be a Multipurpose Internet Mail Extensions (MIME) attachment. Alternatively, the message sent to the voicemail receiver may be formatted as a text message that may be converted to an audio format by a text-to-speech module at the voicemail system 160 of the voicemail receiver.

At block 418, the voicemail message constructed by the message notification and consolidation module is transmitted to the voicemail receiver at the voicemail receiver's voicemail box at the voicemail system 160 as a packetized data transmission through the region wide messaging network through a data transmission protocol such as the Transmission Control Protocol/Internet Protocol (TCP/IP). At block 420, the voicemail message is received at the subscriber's voicemail box and a voicemail message received indication is activated at the subscriber's telephone 165, 170 or other voice message-receiving device. For example, as described above, a voice message received light may be illuminated, a distinctive ring or dialtone may be provided, and the like.

According to embodiments of the present invention, the message notification and consolidation module continues to monitor the subscriber's e-mail box 125 to determine whether additional electronic mail messages are received by the subscriber or to determine whether the subscriber has read, deleted or otherwise disposed of previously received e-mail messages. Likewise, the message notification and consolidation module may periodically monitor the voicemail box of the subscriber at the voicemail system 160 to determine whether the subscriber has reviewed any voicemail notification messages sent to the subscriber by the message notification and consolidation module.

At block 422, a determination is made as to whether a second or subsequent electronic mail message is received by the subscriber before the subscriber has opened, read or otherwise disposed of a previous e-mail message for which a voicemail message notification was sent by the message notification and consolidation module to the subscriber. If not, the method proceeds to block 438, and the subscriber opens the voicemail message received from the message notification and consolidation module and learns that an electronic mail message has been received at the subscriber's e-mail box 125. As will be discussed in detail below, if a second or subsequent e-mail message has been received by the subscriber at the subscriber's e-mail box 125 prior to review of the voicemail message previously sent to the subscriber, the method proceeds to step 424, and the message notification and consolidation module deletes the previously sent voicemail message and constructs a consolidated voicemail message covering all received e-mail messages to prevent the subscriber from having to listen to multiple voicemail messages from the message notification and consolidation module regarding received e-mail messages. At block 440, the voicemail system sends a message waiting indicator off (MWI:OFF) message to the MNCM to notify the MNCM that the voicemail notification message has been reviewed by the subscriber.

At block 442, the subscriber checks the subscriber's e-mail box and disposes of the e-mail from the sender. For example, the subscriber may read the e-mail, delete the e-mail, forward the e-mail, etc. At block 444, the message notification and consolidation module continues to monitor the subscriber's e-mail box 125, and a determination may be made that an e-mail message about which a notification message was previously sent to the subscriber, at the subscriber's voicemail box, has been disposed of by the subscriber. Alternatively, the message notification module may learn at block 470 that a second or subsequent e-mail message has been received by the subscriber.

At block 446, the message notification and consolidation module obtains the subscriber's voicemail box password or other required authentication credentials in order to obtain access to the subscriber's voicemail box at the voicemail system 160. At block 448, the message notification and consolidation module opens the subscriber's voicemail box and searches for prior voice e-mail notification messages sent to the subscriber. As described above, the message notification and consolidation module provides a unique identification tone at the beginning of each e-mail notification voicemail message 300 sent to the subscriber's voicemail box. Accordingly, at block 480, the message notification and consolidation module utilizes the unique identification tone at the beginning of any e-mail notification message sent to the subscriber to locate a particular message. In this way, unrelated voicemail messages are left untouched.

At block 450, the message notification and consolidation module locates the previously sent e-mail notification message using the unique identification tone entered at the beginning of the voicemail message 300. If the located message is associated with an electronic mail message that has now been read, deleted or otherwise disposed of by the voicemail receiver/e-mail receiver, the voicemail message is deleted to prevent confusion of the voicemail receiver or to avoid annoying the voicemail receiver with the voicemail message. As should be understood, if the voicemail receiver has reviewed the voicemail message prior to disposing of the e-mail message, the voicemail receiver may have already deleted the voice message from his/her voicemail box. The method then proceeds back to block 408 where the MNCM continues to monitor the subscriber's email box.

If at block 422, the message notification and consolidation module determines that a second or subsequent e-mail message has been received at the e-mail box 125 before the voicemail receiver/e-mail receiver has had an opportunity to review a previous voicemail message regarding a first or previous e-mail message, the method proceeds to block 424, and the MNCM obtains access information (password, voicemail number, and the like) for the subscriber's voicemail box as described above with reference to block 448. At block 426, the message notification and consolidation module constructs a second e-mail notification voicemail message containing information regarding the first and subsequent e-mail messages received by the subscriber. At block 428, the second notification message is transmitted by the MNCM to the subscriber's voicemail box.

At block 430 the MNCM accesses the subscriber's voicemail box, and at block 432 the MNCM searches for the first notification message by searching for the unique identification tone inserted in the first notification message. At block 434, the message notification and consolidation module deletes the first notification message sent to the e-mail receiver's voicemail box in order to deposit the second or consolidated voicemail message covering the first and subsequent e-mail messages received by the e-mail receiver. At block 436, the MNCM activates the subscriber's message waiting indicator to alert the subscriber of a waiting voicemail message. The method then proceeds back to block 422 and proceeds as described above.

By searching for and deleting the previously sent e-mail notification voicemail message by locating the previously sent voicemail message using the unique identification tone entered at the beginning of the voicemail message, the message notification and consolidation module manages voicemail messages sent to the subscriber. Thus, a minimum amount of distraction is visited upon the subscriber, and the subscriber receives helpful information regarding e-mail messages received by the subscriber.

According to an alternate embodiment, a notification message 300 may be deposited into a subscriber's voicemail box to notify the subscriber of an event or other items of interest other than email received by the subscriber. In such cases the MNCM may be utilized to contact the subscriber's voicemail box to delete a previous voicemail notification or to deposit a consolidated message or a new message altogether. Voicemail messages may be deposited into the subscriber's voicemail box as described above with reference to FIG. 4, or voicemail notification messages may be deposited by conventional means as described above with reference to FIG. 2. That is, a voicemail notification sender may place a call to the subscriber and leave a message if the subscriber does not answer, or the sender may contact the subscriber's voicemail box directly at the voicemail system 160, 180 without ringing the subscriber's telephone.

For example, according to this embodiment, an emergency message or any other information of interest may be deposited in the subscriber's voicemail box via a message 300. For example, a school official might have a message deposited into the voicemail box of a student's parent notifying the parent that her child is ill. If the child subsequently feels better, the school official may utilize the MNCM to enter the parent's voicemail box, search for the previous notification message based on a unique identification tone and delete or replace the message. As should be understood this example is by way of illustration only and is not limiting of the scope of the invention claimed herein.

As described herein, methods and systems are provided for notifying a subscriber of the receipt of electronic mail messages via notification messages sent to the subscriber's voicemail box. Voicemail messages sent to the subscriber's voicemail box are identified and managed by a message notification and consolidation module via the inclusion of a unique identification tone provided at the beginning of the voicemail messages. It will be apparent to those skilled in the art that various modifications or variations may be made in the present invention without departing from the scope or spirit of the invention. Other embodiments of the invention will be apparent to those skilled in the art from consideration of the specification and practice of the invention disclosed herein.

What is claimed is:

1. A method of notifying an electronic mail recipient of electronic mail receipt via voicemail messaging, comprising:
   receiving a first electronic mail (e-mail) message at a subscriber e-mail box;
   constructing a first e-mail received notification message, wherein constructing the first e-mail received notification message comprises converting information from the first e-mail message into a voicemail message;
   annotating the first e-mail received notification message with a unique identification tone for identifying the first e-mail received notification message;
   transmitting the first e-mail received notification message to a subscriber voicemail box;
   receiving a second e-mail message at the subscriber e-mail box prior to determining the first e-mail message has been disposed of in the subscriber e-mail box, wherein if the second e-mail message is received at the subscriber e-mail box prior to disposition of the first e-mail message in the subscriber e-mail box, deleting the first e-mail received notification message from the subscriber voicemail box; and
   if the first e-mail message is disposed of, locating the first e-mail received notification message in the subscriber voicemail box via the unique identification tone;
   deleting the first e-mail received notification message from the subscriber voicemail box, wherein deleting the first e-mail received notification message from the subscriber voicemail box includes searching the subscriber voicemail box for a voicemail message having the unique identification tone, and wherein after deleting the first e-mail received notification message from the subscriber voicemail box;
   constructing a second e-mail received notification message containing notification information from both the first e-mail message and the second e-mail message;
   annotating the second e-mail received notification message with a second unique identification tone for identifying the second e-mail received notification message; and
   transmitting the second e-mail received notification message to a subscriber voicemail box.

2. The method of claim 1, whereby receiving the first electronic mail message at the subscriber e-mail box, includes receiving the first e-mail message via an e-mail provider system.

3. The method of claim 2, prior to the step of receiving a first e-mail message at a subscriber e-mail box, further comprising monitoring the subscriber e-mail box via the e-mail provider system.

4. The method of claim 3, after receiving the first e-mail message at the subscriber e-mail box, obtaining a telephone directory number for the subscriber voicemail box.

5. The method of claim 4, after obtaining the telephone directory number for a subscriber voicemail box, obtaining an electronic messaging address for the subscriber voicemail box.

6. The method of claim 1, after transmitting the first e-mail received notification message to the subscriber voicemail box, activating a voicemail received indication at the subscriber voicemail box.

7. The method of claim 6, whereby activating a voicemail received indication at the subscriber voicemail box includes activating a voicemail received indication at a subscriber voicemail box access device.

8. The method of claim 7, whereby the voicemail box access device includes a telephone.

9. The method of claim 7, whereby the voicemail box access device includes a personal digital assistant.

10. The method of claim 3, whereby monitoring the subscriber e-mail box by the e-mail provider system includes monitoring a disposition status of the first e-mail message.

11. The method of claim 10, whereby monitoring the disposition status of the first e-mail message has been disposed of in the subscriber e-mail box.

12. The method of claim 11, whereby determining the first e-mail message has been disposed of in the subscriber e-mail box includes determining the first e-mail message has been deleted from the subscriber e-mail box.

13. The method of claim 11, whereby determining the first e-mail message has been disposed of in the subscriber e-mail box includes determining the first e-mail message has been read.

14. The method of claim 1, further comprising receiving the first e-mail received notification message at the subscriber voicemail box; and reviewing the first e-mail received notification message by the subscriber.

15. The method of claim 14, further comprising receiving the second e-mail received notification message at the subscriber voicemail box; and reviewing the second e-mail received notification message by the subscriber.

* * * * *